United States Patent [19]

Purcell

[11] 4,111,064
[45] Sep. 5, 1978

[54] SPROCKET SEGMENTS PROVIDING GREATER RETENTION CAPABILITIES

[75] Inventor: Robert J. Purcell, Washington, Ill.

[73] Assignee: Caterpillar Tractor Co., Peoria, Ill.

[21] Appl. No.: 788,863

[22] Filed: Apr. 19, 1977

[51] Int. Cl.² .................. F16H 55/12; F16H 55/30
[52] U.S. Cl. .................. 74/243 DR; 74/447; 74/448
[58] Field of Search .......... 74/243 DR, 243 PC, 450, 74/439, 448, 243 R, 446, 447; 305/57

[56] References Cited

U.S. PATENT DOCUMENTS

| | | | |
|---|---|---|---|
| 1,384,623 | 7/1921 | Meredith, Jr. | 74/448 |
| 1,433,923 | 10/1922 | Anthony | 74/243 DR |
| 1,643,472 | 9/1927 | Rorabeck | 74/243 DR |
| 1,645,268 | 10/1927 | Walker | 74/448 |
| 2,230,902 | 2/1941 | Overbey | 74/448 |
| 2,707,884 | 5/1955 | Boisvert | 74/448 |
| 3,220,273 | 11/1965 | Christian | 74/243 DR |
| 3,439,551 | 4/1969 | Militana | 74/450 |
| 3,472,090 | 10/1969 | Dawe | 74/243 R |
| 3,742,779 | 7/1973 | Shaver | 74/448 |
| 4,058,023 | 11/1977 | Smith | 74/243 DR |

FOREIGN PATENT DOCUMENTS 1,027,474  3/1953  France ................ 74/243 DR

Primary Examiner—Samuel Scott
Assistant Examiner—William R. Henderson
Attorney, Agent, or Firm—Wegner, Stellman, McCord, Wiles & Wood

[57] ABSTRACT

A chain drive sprocket formed of a plurality of sprocket segments arranged seriatim alternately to define a continuous equiangularly spaced annular series of sprocket teeth with a first group of the sprocket segments having a different number of teeth from the alternating second group. Each of the segments may have a similar number of mounting bolt holes, which, in the circular sprocket arrangement, are equiangularly spaced about the axis of the sprocket. The sprocket segments are of different angular extent and the end bolt holes of different sprocket segments may be spaced differently from the end surfaces of the sprocket segments. The sprocket radii centered between opposed adjacent end surfaces may be angularly spaced from the radial centerline through the root between the end teeth of the sprocket segments at opposite sides of the adjacent end surfaces.

15 Claims, 2 Drawing Figures

SPROCKET SEGMENTS PROVIDING GREATER RETENTION CAPABILITIES

BACKGROUND OF THE INVENTION

1. Field of the Invention

This invention relates to chain drive sprockets and in particular to segmented chain drive sprockets.

2. Description of the Prior Art

The conventional chain drive sprocket comprises a one-piece member which is mounted to a drive shaft and which is provided with peripheral teeth for engagement with the chain bushings for effectively driving the chain trained thereover. One such chain drive and sprocket arrangement is shown in U.S. Letters Pat. No. 3,194,609, of Lloyd Thurlow.

In one modified form, a plurality of sprocket segments are bolted to an annular carrier in series relationship to define a continuous toothed periphery for engaging and driving the chain. It has been conventional in such sprocket segment structures to utilize relatively short segments having a relatively small number of teeth per segment. Thus, illustratively, a conventional multi-segment sprocket construction has utilized three teeth per segment. Thus, in the prior art 27-tooth sprocket, nine relatively short 40° sprocket segments each having three teeth were employed.

SUMMARY OF THE INVENTION

The present invention is directed to an improved, low cost, readily assemblable sprocket.

The present sprocket design utilizes relatively large segments permitting the use of improved securing means which illustratively may include a relatively large number of mounting bolts.

More specifically, the present invention comprehends an improved chain drive sprocket construction wherein a first plurality of sprocket segments is alternated with a second plurality having a different small number of teeth from the segments of the first plurality.

In the illustrated embodiment wherein a final sprocket configuration having 27 teeth is provided, the different sprocket segments utilize four and five teeth respectively with three of each of the sprocket segments defining the plurality thereof.

While the sprocket segments of the different pluralities differ in the number of teeth provided therein, each of the segments of each of the pluralities utilizes the same number of mounting bolt holes to provide improved strength with minimum size and facilitated manufacture.

In the illustrated embodiment, the number of teeth of the first plurality is one greater than the number of teeth in the second plurality.

In the illustrated embodiment, each sprocket segment terminates at its opposite ends in the end root portion of the end teeth thereof. More specifically, each of the segments terminates adjacent the centerline of the end root portion.

To provide proper strength in each of the segments, the present invention provides at least a three-degree angular displacement of the end bolt holes from the opposite ends of the segments.

BRIEF DESCRIPTION OF THE DRAWING

Other features and advantages of the invention will be apparent from the following description taken in connection with the accompanying drawing wherein.

DESCRIPTION OF THE PREFERRED EMBODIMENTS

Figure 1:
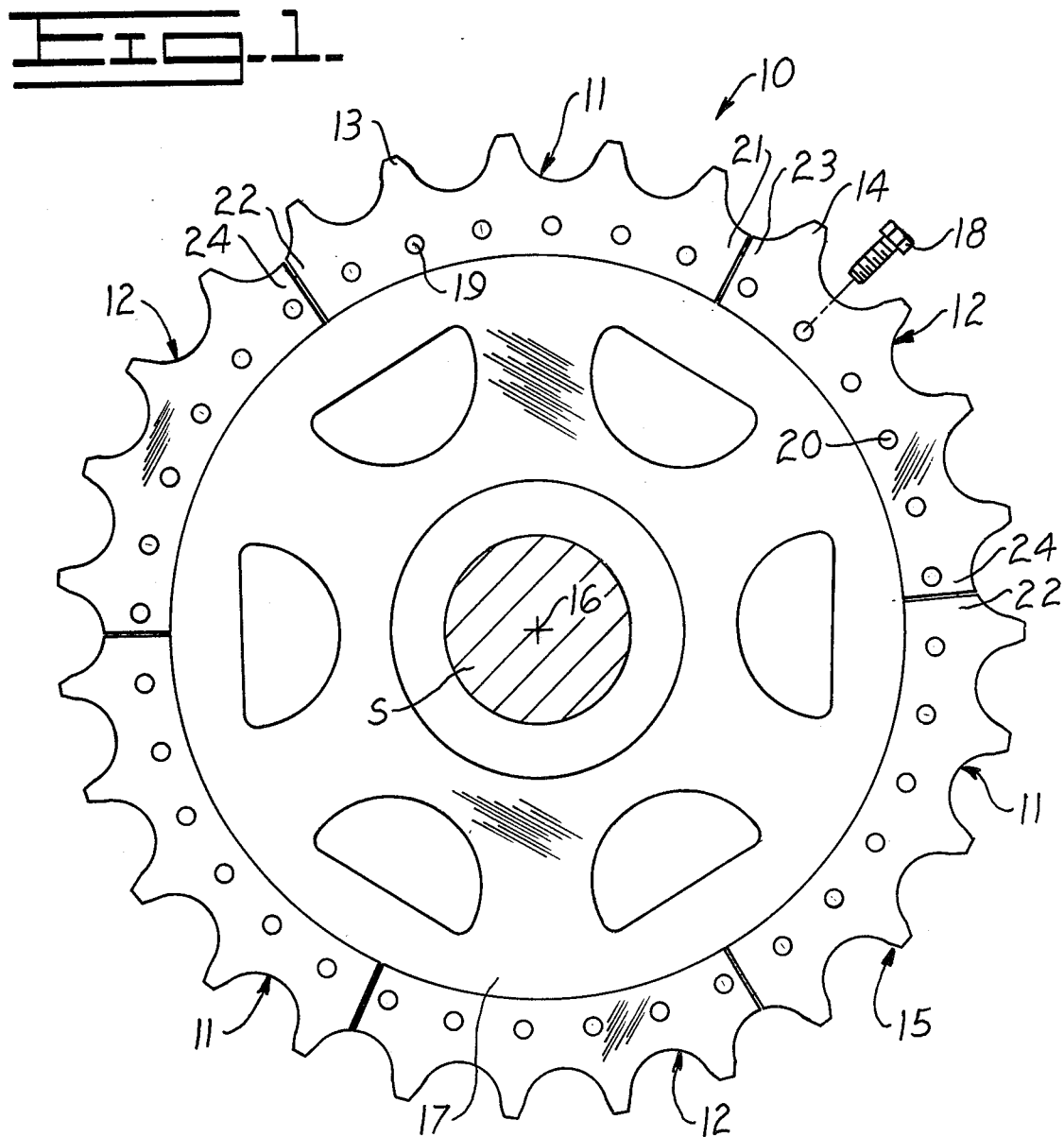
FIG. 1 is an elevation of a chain drive sprocket embodying the invention.

In the exemplary embodiment of the invention as shown in FIG. 1 of the drawing, a chain drive sprocket generally designated 10 is shown to comprise a plurality of first sprocket segments generally designated 11 and a second plurality of segments generally designated 12 with the first and second sprocket segments being disposed seriatim alternately to define a circular sprocket 10.

First segments 11 are each provided with a first plurality of teeth 13 which, in the illustrated embodiment, comprises a plurality of five, and the sprocket segments 12 are each provided with a second plurality of teeth 14 which, in the illustrated embodiment, comprises a plurality of four. In the illustrated embodiment, three sprocket segments 11 are alternated with three sprocket segments 12 and thus the cumulative sprocket segment arrangement defines a circular sprocket having a total of 27 teeth.

The annular array generally designated 15 of the sprocket teeth defines a series of equiangularly spaced teeth about the axis 16 of the sprocket.

The sprocket further includes a mounting hub 17 adapted to be mounted to an axial shaft S. The sprocket segments are secured to the hub by suitable securing means, such as mounting bolts 18. In FIG. 1, only one mounting bolt is illustrated. Each of the segments is provided with suitable mounting bolt holes, including holes 19 in segments 11 and holes 20 in segments 12. Each of the segments is provided with a similar number of mounting bolt holes which, in the illustrated embodiment, comprises six.

More specifically in the illustrated embodiment, each of the segments is arranged to be secured by six mounting bolts. The longer sprocket segments 11 may have an angular extent of approximately 64°, and the shorter sprocket segments 12 may have an angular extent of 56°, with the opposite ends 21 and 22 of the segments 11 abutting the opposite ends 23 and 24 of the adjacent segments 12. Similarly, the opposite ends 23 and 24 of the segments 12 abut the adjacent ends 21 and 22 of the adjacent segments 11.

The arrangement of the individual segments is preselected to assure that the ends thereof terminate away from the tip portion of the end teeth of the segments. Thus, in the illustrated embodiment, each of the ends 21, 22, 23 and 24 is closely adjacent the centerline of the outer end root portion of the outer end teeth of each of the segments. It is important in the design of such segments to assure that the abutment between the successive segments occurs closer to the centerline of the root portion than to the centerline of the projecting teeth to provide improved maximum strength and long life in the use of the sprocket.

As discussed above, by utilizing the sprocket segment design of the present invention, a large number of bolt holes may be provided for improved positive securing of the segments to the hub member for further providing long life of the sprocket. In the illustrated embodiment, the arrangement of the bolt holes is such that no bolt hole is any closer than approximately three degrees, as measured from the axis 16, to the end of the sprocket, thus assuring a relatively strong support of the segment by all bolts, including those at the opposite ends of the segment. In the illustrated embodiment, the arcuate spacing of the respective mounting bolt holes, in the assembled sprocket arrangement of FIG. 1, is 10°, as 36 such holes are provided in the six alternating sprocket segments.

Thus, the present invention comprehends providing a plurality of alternating segments to define a sprocket wherein a first plurality of the segments has a greater number of teeth than the other alternated plurality. More specifically, the invention comprehends providing such an arrangement wherein the first plurality has a number of teeth which is one greater than the number of teeth of the alternating second plurality. The invention further comprehends that, notwithstanding the difference in the number of teeth provided in the different segments, each of the segments utilizes the same number of mounting bolt holes while yet assuring that the end mounting bolt holes in each segment are sufficiently spaced from the opposite ends thereof to provide optimum strength in the segment design. The invention further comprehends arranging the segments so that the ends of the segments occur adjacent the center of the root portion of the end teeth to provide further optimum strength in the design of the segments.

Figure 2:
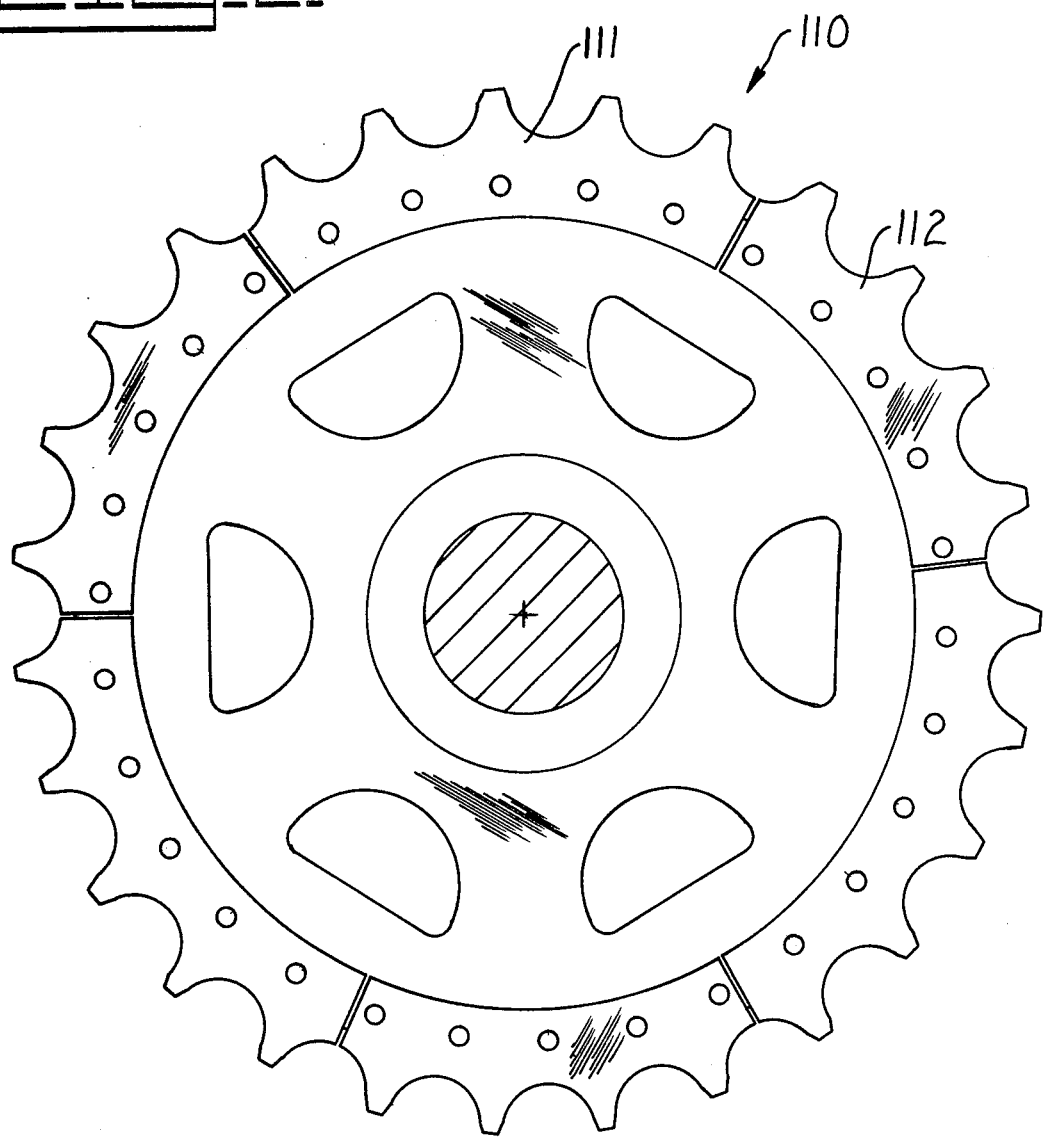
FIG. 2 is an elevation of a modified form of such chain drive sprocket.

Referring now to FIG. 2, a modified form of chain drive sprocket embodying the invention generally designated 110 is shown to comprise a sprocket generally similar to sprocket 10 but having an angular extent of the respective segments 111 and 112 of 66° and 54°, and a smaller number of mounting bolt holes which, in the illustrated embodiment, comprises five.

In all other respects, the sprocket 110 is similar to and functions similarly to drive sprocket 10 of the first embodiment.

In each of the illustrated embodiments, the segments do not abut each other at the opposite ends thereof but are slightly spaced apart. In the illustrated embodiment, the spacing therebetween is approximately three-tenths of a degree.

The chain drive sprockets of the present invention are extremely simple and economical of construction while yet providing the highly desirable features discussed above.

The foregoing disclosure of specific embodiments is illustrative of the broad inventive concepts comprehended by the invention.

The embodiments of the invention in which an exclusive property or privilege is claimed are defined as follows:

1. A chain drive sprocket comprising:
   a hub;
   a plurality of first sprocket segments each having a first plurality of sprocket teeth and a plurality of arcuately spaced mounting bolt holes; and
   a plurality of second sprocket segments each having a second, different plurality of sprocket teeth and a plurality of arcuately spaced mounting bolt holes, said first and second sprocket segments being mounted seriatim alternately to said hub by a plurality of bolts to define a circular sprocket with said sprocket teeth thereof defining a continuous equiangularly spaced annular series and the bolt holes thereof defining a continuous equiangularly spaced annular series, the angular extent of said first segments being greater than the angular extent of said second segments, each segment defining opposite end surfaces spaced from the tip of the end teeth thereof an angular distance different from one-half the tip-to-tip angular spacing of said annular series of sprocket teeth whereby the radii of the sprockets centered between the confronting opposed end surfaces of each pair of segments are asymmetrically disposed relative to the radial centerline of the root between the end teeth of the segments at opposite sides of said confronting opposed end surfaces, each segment end surface being angularly spaced from said radial centerline less than the angular spacing thereof from the tip of the end tooth adjacent the end surface, the angular spacing of the end bolt holes from said segment end surfaces of said first sprocket segments being different from the angular spacing of the end bolt holes from the segment end surfaces of said second sprocket segments.

2. The chain drive sprocket of claim 1 wherein said first sprocket segments are provided with five teeth and said second sprocket segments are provided with four teeth.

3. The chain drive sprocket of claim 2 wherein said first sprocket segments have an angular extent of approximately 66° and the angular extent of said second sprocket segments have an angular extent of approximately 54° and said plurality of mounting bolt holes is five.

4. The chain drive sprocket of claim 2 wherein said first sprocket segments have an angular extent of approximately 64° and the angular extent of said second sprocket segments have an angular extent of approximately 56° and said plurality of mounting bolt holes is six.

5. The chain drive sprocket of claim 1 wherein said confronting opposed segment end surfaces are spaced angularly apart in the circular sprocket arrangement.

6. The chain drive sprocket of claim 1 wherein the number of mounting bolt holes in said first sprocket segments is the same as the number in said second sprocket segments.

7. The chain drive sprocket of claim 1 wherein the number of mounting bolt holes in each of said first and second segments is at least five.

8. The chain drive sprocket of claim 1 wherein the arcuate extent of each segment between each end mounting bolt hole and the adjacent side edge of the segment is at least approximately 3°.

9. The chain drive sprocket of claim 1 wherein the center-to-center arcuate spacing of said mounting bolt holes is 10°.

10. The chain drive sprocket of claim 1 wherein the number of teeth of each of said first sprocket segments is one more than the number of teeth of each of said second sprocket segments.

11. The chain drive sprocket of claim 1 wherein the total number of teeth of said sprocket is an odd number.

12. The chain drive sprocket of claim 1 wherein the total number of teeth of said sprocket is an odd number, the number of teeth of said first sprocket segments being an odd number and the number of teeth of said second sprocket segments being an even number.

13. The chain drive sprocket of claim 1 wherein the number of mounting bolt holes in each of said first and second segments is five.

14. The chain drive sprocket of claim 1 wherein the center-to-center arcuate spacing of said mounting bolt holes is 12°.

15. The chain drive sprocket of claim 1 wherein the number of mounting bolt holes in each of said first and second segments is six.

* * * * *